United States Patent
Cheng et al.

(10) Patent No.: US 10,554,280 B2
(45) Date of Patent: Feb. 4, 2020

(54) DEVICE, NETWORK, AND METHOD FOR CSI FEEDBACK OF HYBRID BEAMFORMING

(71) Applicant: Futurewei Technologies, Inc., Plano, TX (US)

(72) Inventors: Qian Cheng, Aurora, IL (US); Weimin Xiao, Hoffman Estates, IL (US); Jialing Liu, Palatine, IL (US)

(73) Assignee: Futurewei Technologies, Inc., Plano, TX (US)

(*) Notice: Subject to any disclaimer, the term of this patent is extended or adjusted under 35 U.S.C. 154(b) by 45 days.

(21) Appl. No.: 15/139,674

(22) Filed: Apr. 27, 2016

(65) Prior Publication Data

US 2016/0323029 A1    Nov. 3, 2016

Related U.S. Application Data

(60) Provisional application No. 62/155,818, filed on May 1, 2015.

(51) Int. Cl.
  *H04B 7/06* (2006.01)
(52) U.S. Cl.
  CPC ......... *H04B 7/0626* (2013.01); *H04B 7/0617* (2013.01)
(58) Field of Classification Search
  CPC .. H04B 7/0626; H04B 7/0417; H04B 7/0617; H04B 7/0408; H04B 7/0413;

(Continued)

(56) References Cited

U.S. PATENT DOCUMENTS

2012/0176939 A1   7/2012  Qu et al.
2013/0258965 A1*  10/2013 Geirhofer ........... H04W 72/048
                                                    370/329

(Continued)

FOREIGN PATENT DOCUMENTS

CN      103812619       5/2014
WO   WO-2014/161183     10/2014
WO   WO-2015/030645 A1   3/2015

OTHER PUBLICATIONS

"International Application No. PCT/CN2016/080718, International Search Report and Written Opinion dated Aug. 3, 2016", (Aug. 3, 2016), 11 pgs.

(Continued)

*Primary Examiner* — Kan Yuen
(74) *Attorney, Agent, or Firm* — Schwegman Lundberg & Woessner, P.A.

(57) ABSTRACT

Various methods and systems are provided to provide for Channel State Information (CSI) feedback of hybrid beamforming. In a first example embodiment, a method for signaling a beamforming reference signal (BFRS) is provided. A resource block is created for the BFRS, the resource block containing a plurality of resource elements, each resource element defined by a time-frequency resource within one subcarrier and one multiplexing symbol. A total number of analog transmit beams for the BFRS is then determined, along with grouping information for the analog transmit beams for the BFRS. Then, the resource block, the total number of analog beams, and the grouping information are transmitted from a first network controller to a user equipment (UE). Then the BFRS is transmitted from the first network controller to the UE.

23 Claims, 11 Drawing Sheets

(58) Field of Classification Search
CPC .... H04B 7/063; H04B 7/0639; H04B 7/0695; H04B 7/088; H04L 25/0226; H04L 5/0023; H04L 5/005; H04L 5/0051; H04L 5/0053; H04L 5/0055; H04L 5/0057; H04L 5/0075; H04L 5/0092; H04W 72/042; H04W 72/046; H04W 72/08
See application file for complete search history.

(56) References Cited

U.S. PATENT DOCUMENTS

| | | | |
|---|---|---|---|
| 2013/0301454 A1 | 11/2013 | Seol et al. | |
| 2014/0029584 A1* | 1/2014 | Qu | H04W 72/042 370/336 |
| 2014/0187171 A1* | 7/2014 | Xiao | H04B 7/0617 455/67.11 |
| 2014/0241242 A1* | 8/2014 | Josiam | H04W 88/02 370/328 |
| 2014/0341146 A1* | 11/2014 | Nakashima | H04W 72/042 370/329 |
| 2014/0369291 A1* | 12/2014 | Zhang | H04L 1/0026 370/329 |
| 2015/0281973 A1* | 10/2015 | Svedman | H04B 7/0691 455/454 |
| 2016/0028463 A1 | 1/2016 | Wang et al. | |
| 2016/0029350 A1* | 1/2016 | Kishiyama | H04W 16/28 370/329 |
| 2016/0226640 A1 | 8/2016 | Seol et al. | |
| 2017/0033856 A1* | 2/2017 | Su | H04B 7/04 |
| 2017/0366326 A1* | 12/2017 | Takano | H04L 5/0073 |
| 2018/0062710 A1* | 3/2018 | Qian | H04B 7/04 |

OTHER PUBLICATIONS

"European Application Serical No. 16789293.4, Supplemental European Search Report dated Apr. 11, 2018", 9 pgs.

* cited by examiner

DEVICE, NETWORK, AND METHOD FOR CSI FEEDBACK OF HYBRID BEAMFORMING

CLAIM OF PRIORITY

This application claims the benefit of priority of U.S. Provisional Patent Application Ser. No. 62/155,818, filed on May 1, 2015, the benefit of priority of which is claimed hereby, and which is incorporated by reference herein in its entirety.

TECHNICAL FIELD

The present disclosure relates to a device, network, and method for wireless communications, and, in particular embodiments, to a device and method for Channel State Information (CSI) feedback of hybrid antenna beamforming.

BACKGROUND

The amount of wireless data utilized in mobile networks has increased dramatically in the last few years, pushing the capacity of current macro cellular deployments. Cellular communications systems, which utilize microwave spectrum bands (300 MHz to 3 GHz), are becoming capacity-limited due to interference and traffic load. The use of high frequency bands, where vast amounts of bandwidth is available, is considered to be a crucial technology for future generation communication systems. The use of these frequency bands (e.g., 28, 38, 60 and 73 GHz) can mitigate the problem of capacity currently observed.

Propagation in the millimeter band (mmWave) is much more challenging than in the microwave band, resulting in a more stringent link budget at a mmWave band than at a microwave band. Equipping both the transmitter and receiver with a larger number of antenna arrays is a viable solution to compensate for the mmWave extra path loss by beamforming.

Since antenna size is inversely proportional to the carrier frequency, the use of these high frequency bands reduces the antenna size considerably. This opens the door to employ a larger number of transmit and receive antenna arrays at both network and terminal sides.

Hybrid antenna architecture may be used to trade off hardware complexity, power consumption, and the performance and coverage of the system. Hybrid antenna architecture typically includes analog (phase shifter) and digital (baseband pre-coder) beamforming parts.

A base station may include one or more Radio Frequency (RF) chains, and each RF chain is connected to analog phase shifters and antenna arrays. A user equipment (UE) receiver may include one or more RF chains connected to receiver analog phase shifters and antenna arrays.

There are different types of analog beamforming architectures. Two such architectures are shared array and sub-array.

SUMMARY

Various methods and systems are provided to provide for channel state information (CSI) feedback of hybrid beamforming. In a first example embodiment, a method for signaling a beamforming reference signal (BFRS) is provided. A resource block is created for the BFRS, the resource block containing a plurality of resource elements, each resource element defined by a time-frequency resource within one subcarrier and one multiplexing symbol. A total number of analog transmit beams for the BFRS is then determined, along with grouping information for the analog transmit beams for the BFRS. Then, the resource block, the total number of analog beams, and the grouping information are transmitted from a first network controller to a user equipment (UE). Then the BFRS is transmitted from the first network controller to the UE.

In a second example embodiment, a method for utilizing a beamforming reference signal (BFRS) is provided. A resource block for the BFRS is received at a UE, along with a total number of analog beams for the BFRS, and grouping information for the BFRS, the resource block containing a plurality of resource elements, each resource element defined by a time-frequency resource within one subcarrier and one multiplexing symbol. Then a BFRS is received by the UE. Beam pair selection is performed to form effective multiple-input and multiple-output (MIMO) channels using the resource block, the total number of analog beams, and the grouping information by selecting one or more best transmit-receive beam pairs, while limiting each effective MIMO channel to including a single transmit analog beam per beam group. Then the UE derives, based on the effective MIMO channels, a corresponding CSI feedback. At least one set of recommendations of a channel for each supported rank by the BFRS is calculated based on the CSI feedback, each supported rank corresponding to a different stream of symbols transmitted in the BFRS. Then the at least one set of recommendations is reported.

In a third example embodiment, another method for utilizing a beamforming reference signal (BFRS) is provided. A resource block for the BFRS is received at the UE, along with a total number of analog beams for the BFRS and grouping information for the BFRS, the resource block containing a plurality of resource elements, each resource element defined by a time-frequency resource within one subcarrier and one multiplexing symbol. Then a BFRS is received by the UE. Beam pair selection is performed to form effective MIMO channels using the resource block, the total number of analog beams, and the grouping information by selecting one or more best transmit-receive beam pairs, while limiting each effective MIMO channel to including a single transmit analog beam per beam group. The UE then transmits to the network controller a report of indexes of the selected best transmit-receive beam pairs. Then the UE transmits to the network controller an uplink sounding signal by applying the selected best transmit-receive beam pairs.

BRIEF DESCRIPTION OF THE DRAWINGS

For a more complete understanding of the present inventive subject matter, and the benefits thereof, reference is now made to the following descriptions taken in conjunction with the accompanying drawings, in which.

DETAILED DESCRIPTION

In the following description, reference is made to the accompanying drawings, which form a part hereof, and in which are shown, by way of illustration, specific embodiments which may be practiced. These embodiments are described in sufficient detail to enable those skilled in the art to practice the subject matter disclosed herein, and it is to be understood that other embodiments may be utilized and that structural, logical, and electrical changes may be made without departing from the scope of the present disclosure. The following description of example embodiments is, therefore, not to be taken in a limiting sense, and the scope of the present disclosure is defined by the appended claims.

The functions or algorithms described herein may be implemented in software or a combination of software and human-implemented procedures in one embodiment. The software may consist of computer-executable instructions stored on computer-readable media or a computer-readable storage device such as one or more non-transitory memories or other types of hardware-based storage devices, either local or networked. Further, such functions correspond to modules, which may be software, hardware, firmware, or any combination thereof. Multiple functions may be performed in one or more modules as desired, and the embodiments described are merely examples. The software may be executed on a digital signal processor, application-specific integrated circuit (ASIC), microprocessor, or other type of processor operating on a computer system, such as a personal computer, server, or other computer system.

In a modern wireless communications system, such as a Third Generation Partnership Project (3GPP) Long Term Evolution (LTE) compliant communications system, a plurality of cells or evolved NodeBs (eNB) (also commonly referred to as NodeBs, base stations (BSs), base terminal stations, communications controllers, network controllers, controllers, access points (APs), and so on) may be arranged into a cluster of cells, with each cell having multiple transmit antennas. Additionally, each cell or eNB may be serving a number of users (also commonly referred to as User Equipment (UE), mobile stations, users, subscribers, terminals, and so forth) based on a priority metric, such as fairness, proportional fairness, round robin, and the like, over a period of time. It is noted that the terms cell, transmission points, and eNB may be used interchangeably. Distinction between cells, transmission points, and eNBs will be made where needed.

Figure 1:
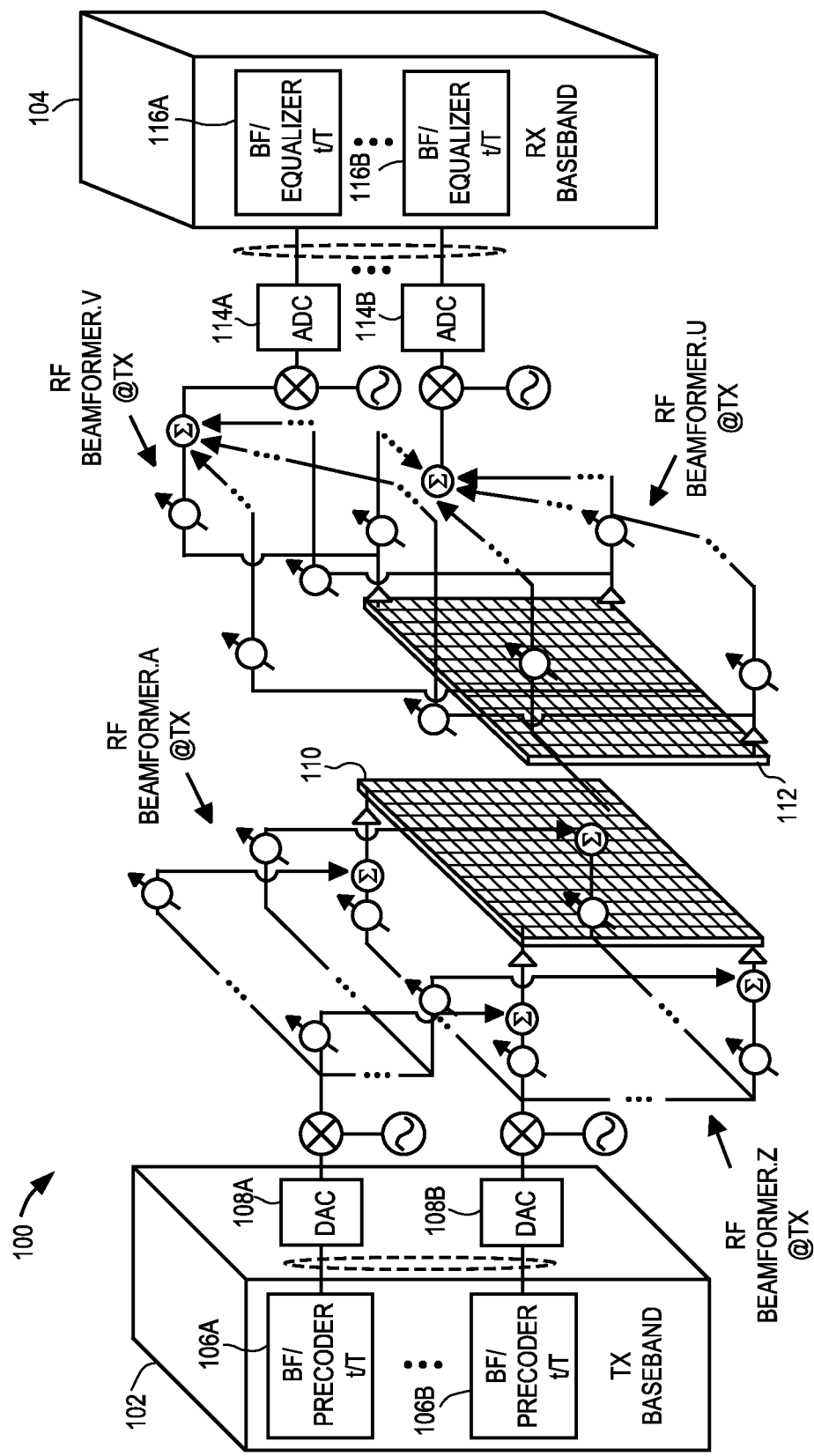
FIG. 1 shows an example of one hybrid beamforming architecture with a shared array.

FIG. 1 shows an example of one hybrid beamforming architecture 100 with a shared array. The architecture 100 includes a baseband beamforming transmitter 102 and a baseband beamforming receiver 104. In one example embodiment the baseband beamforming transmitter 102 may be implemented as a baseband beamforming transmission means. In another example embodiment, the baseband beamforming receiver 104 may be implemented as a baseband beamforming receiving means. The baseband beamforming transmitter 102 includes a plurality of precoders 106A-106B. The precoders 106A-106B act to exploit transmit diversity by weighting information streams. In an example embodiment, each of the precoders 106A-106B may be implemented as a precoding means. Digital-to-Analog converters (DACs) 108A, 108B then act to convert the precoded digital signals to analog signals to send to the transmitter shared array 110. In an example embodiment, each of the DACs 108A, 108B may be implemented as a digital-to-analog conversion means. In another example embodiment, the transmitter shared array 110 may be implemented as a transmitter shared array means. A receiver shared array 112 then receives the transmitted signal, and one or more analog-to-digital converters (ADCs) 114A, 114B convert the received signal to digital. In an example embodiment, the receiver shared array 112 may be implemented as a receiver shared array means. In another example embodiment, each of the ADCs 114A, 114B may be implemented as an analog-to-digital conversion means. Finally, one or more equalizers 116A, 116B to equalize the digital signals. In an example embodiment, each of the equalizers 116A, 116B may be implemented as an equalization means.

Figure 2:
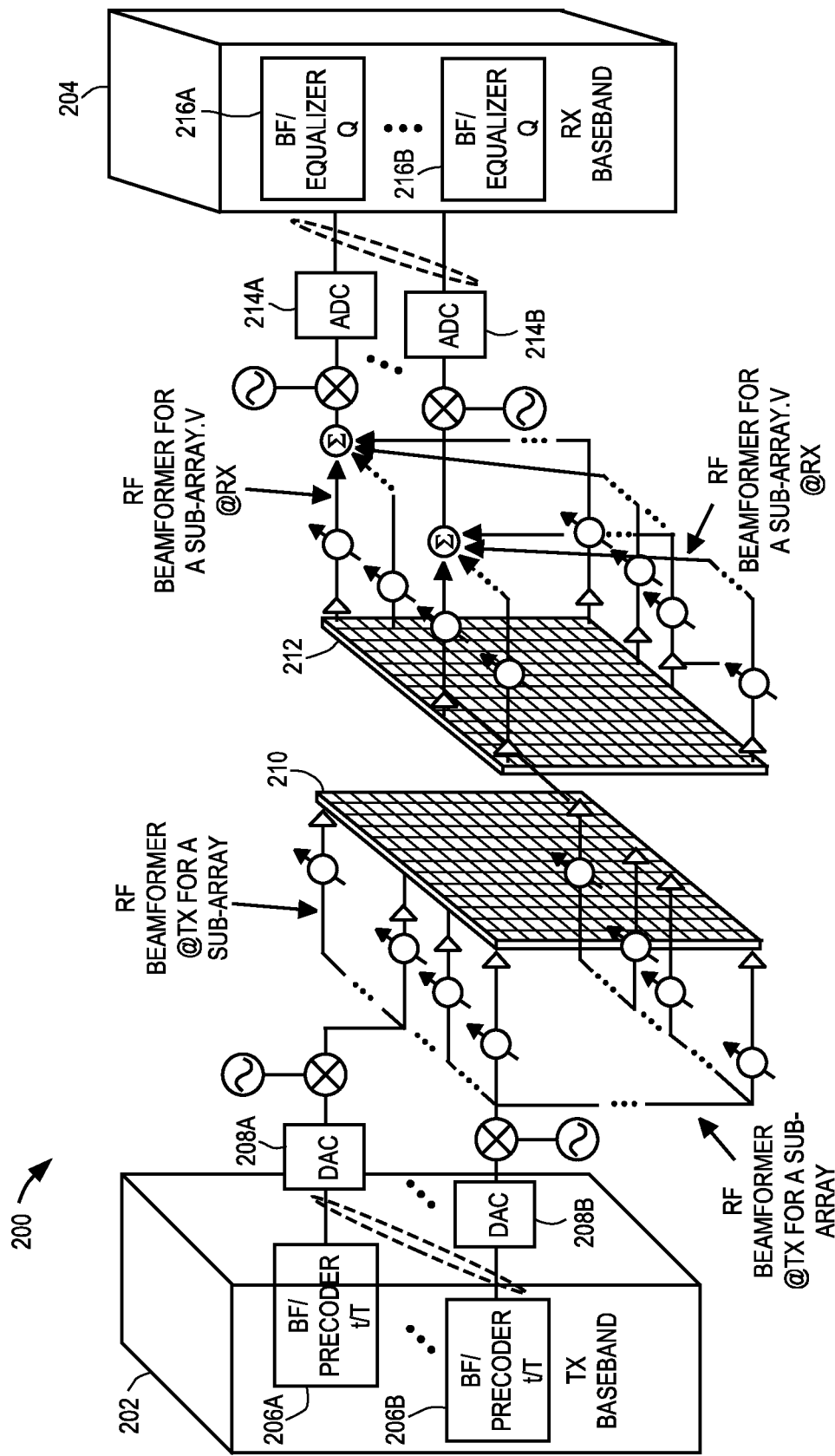
FIG. 2 shows an example of another hybrid beamforming architecture with a sub-array.

FIG. 2 shows an example of another hybrid beamforming architecture 200 with a sub-array. This architecture 200 provides a lower complexity version of the hybrid beamforming architecture 100 of FIG. 1 by reducing the number of phase shifters and omitting the need for RF combiners on the transmission side. However, the rest of the architecture 200 is the same as the shared hybrid beamforming architecture 100 of FIG. 1. The architecture 200 includes a baseband beamforming transmitter 202 and a baseband beamforming receiver 204. In one example embodiment the baseband beamforming transmitter 202 may be implemented as a baseband beamforming transmission means. In another example embodiment, the baseband beamforming receiver 204 may be implemented as a baseband beamforming receiving means. The baseband beamforming transmitter 202 includes a plurality of precoders 206A-206B. The precoders 206A-206B act to exploit transmit diversity by weighting information streams. In an example embodiment, each of the precoders 206A-206B may be implemented as a precoding means. Digital-to-Analog converters (DACs) 208A, 208B then act to convert the precoded digital signals to analog signals to send to the transmitter sub-array 210. In an example embodiment, each of the DACs 208A, 208B may be implemented as a digital-to-analog conversion means. In another example embodiment, the transmitter sub-array 210 may be implemented as a transmitter shared array means. A receiver sub-array 212 then receives the transmitted signal, and one or more analog-to-digital converters (ADCs) 214A, 214B convert the received signal to digital. In an example embodiment, the receiver sub-array 212 may be implemented as a receiver sub-array means. In another example embodiment, each of the ADCs 214A, 214B may be implemented as an analog-to-digital conversion means. Finally, one or more equalizers 216A, 216B equalize the digital signals. In an example embodiment, each of the equalizers 216A, 216B may be implemented as an equalization means.

Figure 3:
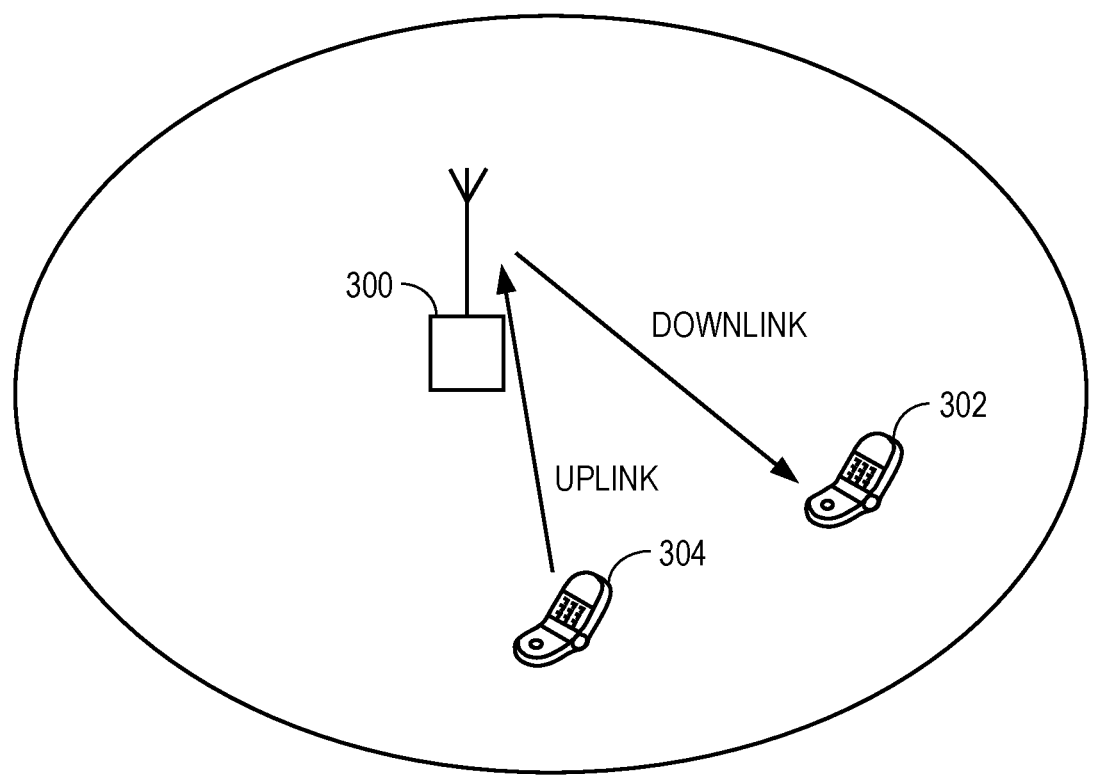
FIG. 3 depicts how the transmission/reception from controller to a UE is called downlink (DL) transmission/reception, and the transmission/reception from a UE to a controller is called uplink (UL) transmission/reception.

FIG. 3 depicts how the transmission/reception from controller 300 to a UE 302 is called downlink (DL) transmission/reception, and the transmission/reception from a UE 304 to a controller 300 is called uplink (UL) transmission/reception.

Figure 4:
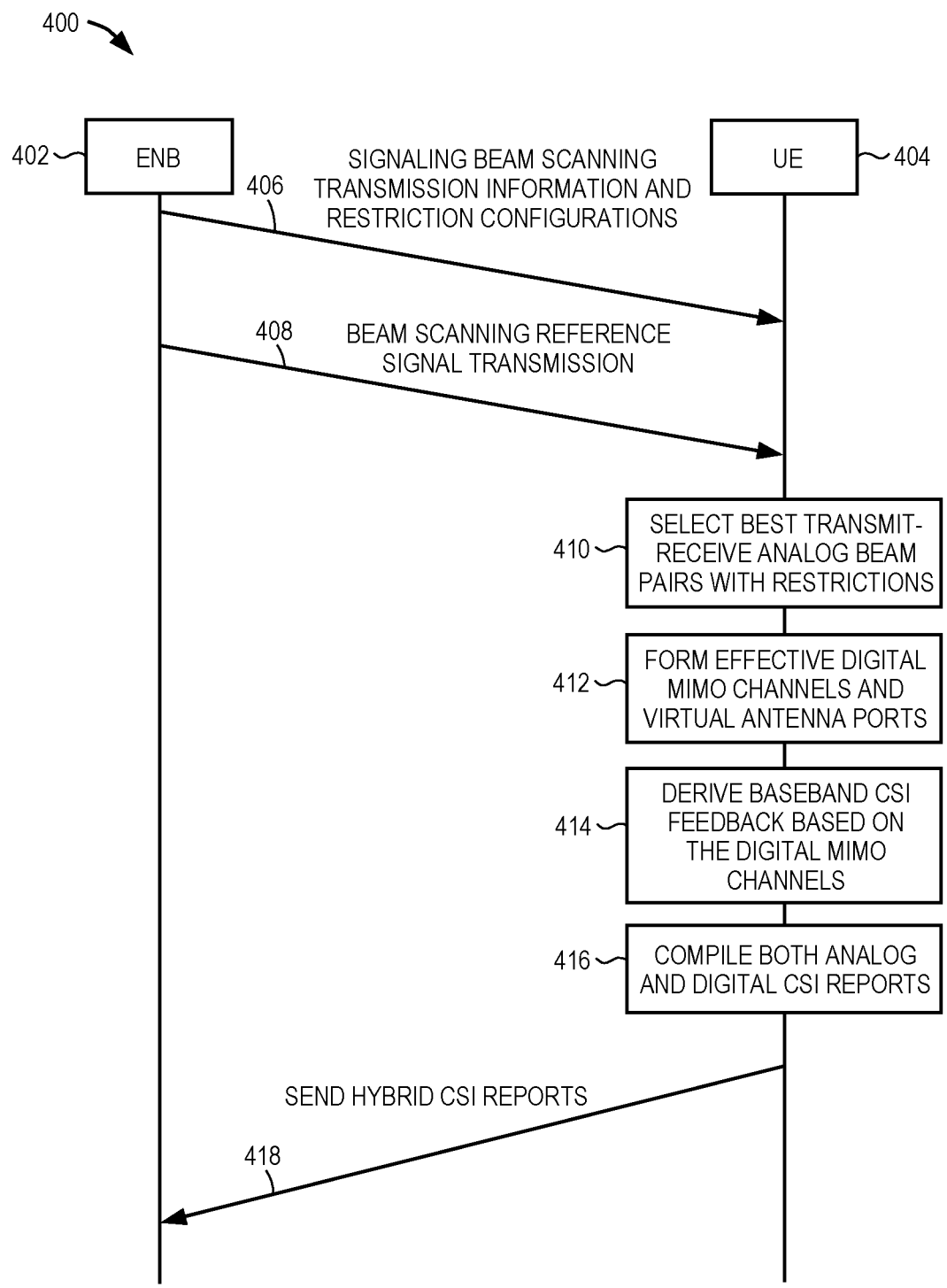
FIG. 4 is an interaction diagram illustrating a method of handshaking between an evolved NodeB (eNB) and an UE in accordance with an example embodiment.

FIG. 4 is an interaction diagram illustrating a method 400 of handshaking between an eNb 402 and a UE 404 in accordance with an example embodiment. Here, at operation 406, the eNb 402 signals beam scanning transmission information and restriction configurations to the UE 404. This may be performed by creating a resource block for the BFRS, the resource block containing a plurality of resource elements, each resource element defined by a time-frequency resource within one subcarrier and one multiplexing symbol, determining a total number of analog transmit beams for the BFRS, and determining grouping information for the analog transmit beams for the BFRS and then transmitting this information to the UE 404. The resource blocks include time and frequency at which the BFRS is transmitted, and a sequence to generate the BFRS. This may also include determining a set of analog beam selection restriction configurations, the analog beam selection restriction configurations indicating a set of analog beams upon which the UE should not derive a digital Channel State Information (CSI) feedback, and transmitting this information to the UE 404.

Then, at operation 408, the eNb 402 transmits the beam scanning reference signal to the UE 404. At operation 410, the UE 404 selects the best transmit-receive analog beam pairs with restrictions. The beam scanning reference signal may be a combination of wide beams and narrow beams. To derive a digital effective channel, the UE 404 can be restricted not to use any of the wide beams. At operation 412, the UE 404 forms effective MIMO channels and virtual antenna ports using the resource block, the total number of analog beams, and the grouping information, while limiting each effective MIMO channel to including a single transmit analog beam per beam group. At operation 414, the UE 404 derives baseband CSI feedback based on the digital MIMO channels. At operation 416, the UE 404 compiles both analog and digital CSI reports. This may include calculating at least one set of recommendations of a channel for each supported rank by the BFR based on the CSI feedback, each supported rank corresponding to a different stream of symbols transmitted in the BFRS. Then, at operation 418, the UE 404 sends hybrid CSI reports (from the analog and digital CSI reports) to the eNb 402.

Figure 5:
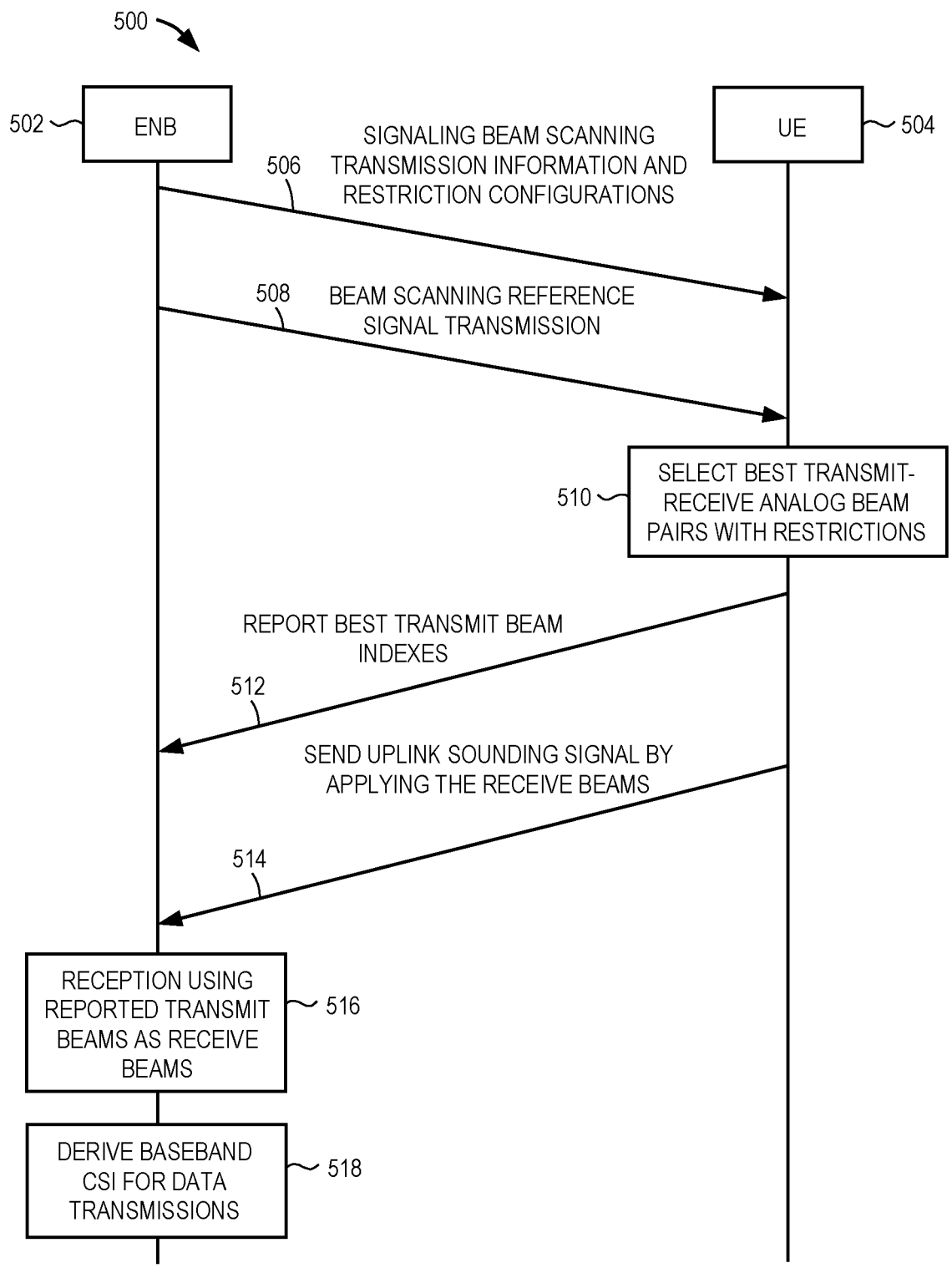
FIG. 5 is an interaction diagram illustrating another method of handshaking between an eNB and an UE in accordance with another example embodiment.

FIG. 5 is an interaction diagram illustrating another method 500 of handshaking between an eNb 502 and a UE 504 in accordance with another example embodiment. Here, at operation 506, the eNb 502 signals beam scanning transmission information and restriction configurations to the UE 504. This may be performed by creating a resource block for the BFRS, the resource block containing a plurality of resource elements, each resource element defined by a time-frequency resource within one subcarrier and one multiplexing symbol, determining a total number of analog transmit beams for the BFRS, and determining grouping information for the analog transmit beams for the BFRS, and then transmitting this information to the UE 504. The resource blocks include time and frequency at which the BFRS is transmitted, and a sequence to generate the BFRS. This may also include determining a set of analog beam selection restriction configurations, the analog beam selection restriction configurations indicating a set of analog beams upon which the UE should not derive a digital Channel State Information (CSI) feedback, and transmitting this information to the UE 504.

Then, at operation 508, the eNb 502 transmits the beam scanning reference signal to the UE 504. At operation 510, the UE 404 selects the best transmit-receive analog beam pairs with restrictions. The beam scanning reference signal may be a combination of wide beams and narrow beams. To derive a digital effective channel, the UE 504 can be restricted not to use any of the wide beams. At operation 512, the UE 504 reports the best transmit beam indexes to the eNb 502. At operation 514, the UE 504 sends an uplink sounding signal to the eNb 502 by applying the receive beams. At operation 516, the eNb 502 receives the signal using the reported transmit beams as receive beams. At operation 518, the baseband CSI is derived for data transmissions.

In Orthogonal frequency-division multiplexing (OFDM) systems, the frequency bandwidth is divided into multiple subcarriers in the frequency domain. In the time domain, one subframe is divided into multiple OFDM symbols. The OFDM symbol may have a cyclic prefix to avoid inter-symbol interference due to multiple path delays. One resource element (RE) is defined by the time-frequency resource within one subcarrier and one OFDM symbol. A reference signal and other signals, such as data channel, e.g. physical downlink shared channel (PDSCH), and control channel, e.g. physical downlink control channel (PDCCH), are orthogonal and multiplexed in different resource elements in the time-frequency domain. Further, the signals are modulated and mapped into resource elements. Using inverse Fourier transform per each OFDM symbol, the signals in the frequency domain are transformed into the signals in the time domain, and are transmitted with an added cyclic prefix to avoid the inter-symbol interference.

Figure 6:
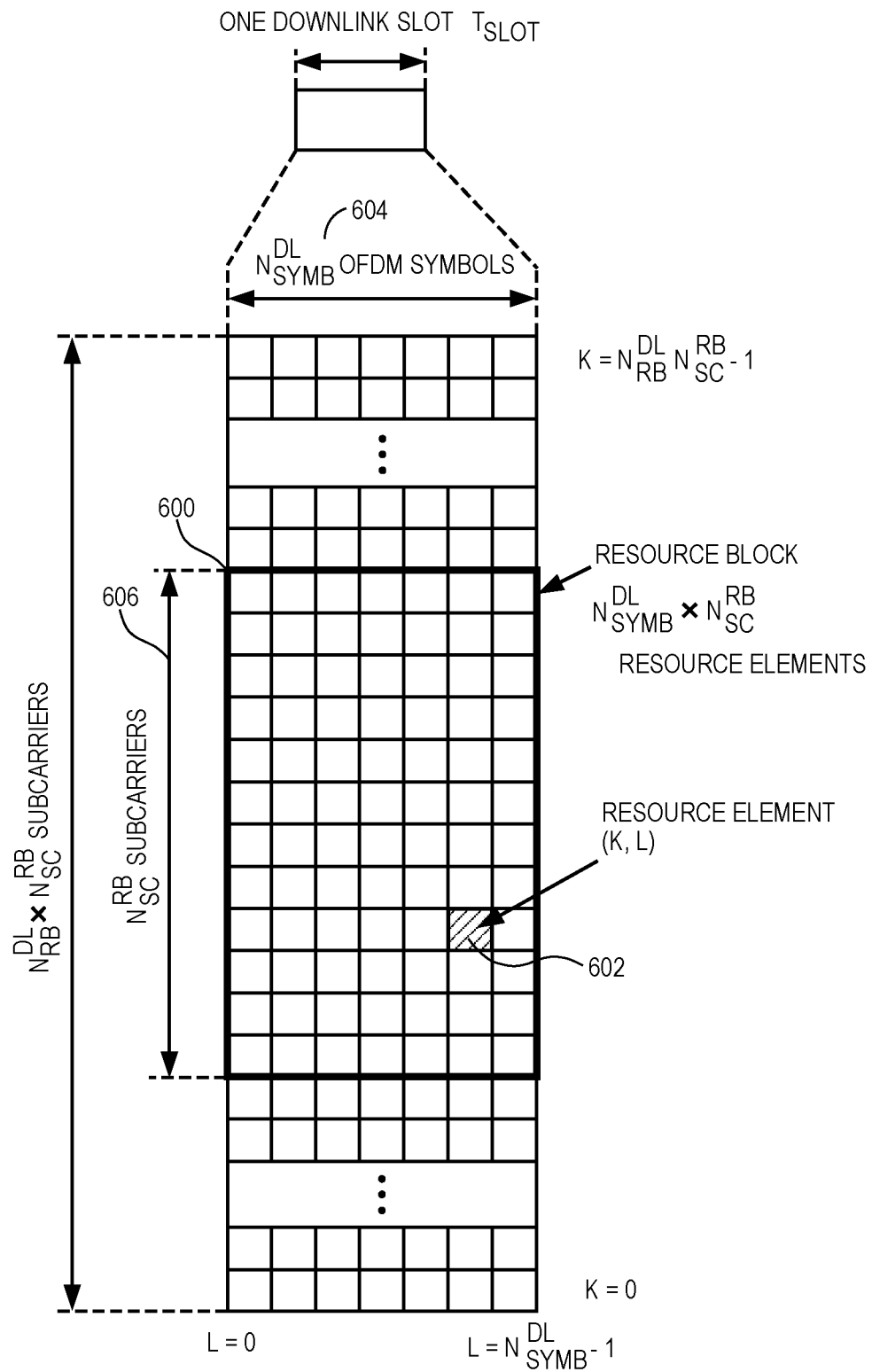
FIG. 6 is a diagram illustrating an example resource block in accordance with an example embodiment.

Each resource block (RB) contains a number of REs. FIG. 6 is a diagram illustrating an example resource block 600 in accordance with an example embodiment. The resource block 600 comprises a number of different resource elements, such as resource element 602. For each resource block 600, there are 14 OFDM symbols labeled from 0 to 13 in each subframe. The symbols 0 to 6 in each subframe correspond to even slots, and the symbols 7 to 13 in each subframe correspond to odd slots. In the figure, only seven OFBM symbols across are shown (604). There are also 12 subcarriers (606) in each resource block 600, and hence in this example, there are 84 REs in a RB. In each subframe, there are a number of RBs, and the number may depend on the bandwidth (BW).

Figure 7:
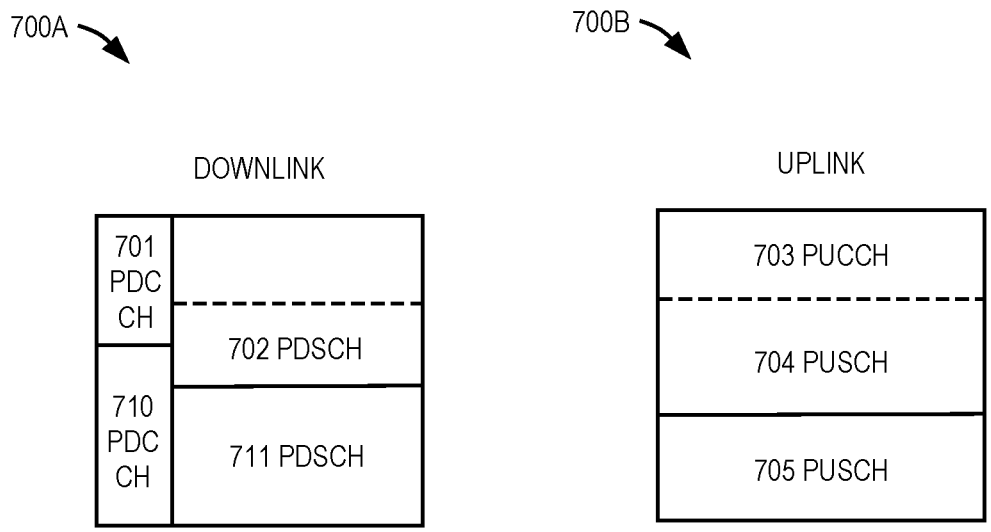
FIG. 7 is a diagram showing example data packets in accordance with an example embodiment.

FIG. 7 is a diagram showing example data packets 700A, 700B in accordance with an example embodiment. The data channels transmitting data packets 700A from an eNB to UEs in the physical layer are called physical downlink shared channel (PDSCH) 702 and 711, and the data channel transmitting data packet 700B from the UEs to the eNB in the physical layer are called physical uplink shared channel (PUSCH) 704 and 705. The corresponding physical control channels, transmitted from the eNB to the UEs, indicate where the corresponding PDSCH 702 and 711 and/or PUSCH 704 and 705 are in the frequency domain, and in which manner the PDSCH 702 and 711 and/or PUSCH 704 and 705 are transmitted. Such physical control channels are called physical downlink control channels (PDCCH) 701 and 710, and physical uplink control channel (PUCCH) 703. In FIG. 7, PDCCH 701 may indicate the signaling for PDSCH 702 or PUSCH 704, and the PDCCH 710 may indicate the signaling for PDSCH 711 or PUSCH 705.

UEs measure the channel status, especially for multiple antennas. PMI/CQI/RI and other feedbacks may be based on the measurement of reference signal. PMI is the precoding matrix indicator, CQI is the channel quality indicator, and RI is the rank indicator of the precoding matrix. There may be multiple reference signal resources configured for a UE. There is specific time-frequency resource and scrambling code assigned by the eNB for each reference signal resource.

Usually, the eNBs may be arranged close to each other so that a decision made by a first eNB may have an impact on a second eNB. For example, the eNBs may use their transmit antenna arrays to form beams towards their UEs when serving them. This may mean that if the first eNB decides to serve a first UE in a particular time-frequency resource, it may form a beam pointing to that UE. However, the pointed beam may extend into a coverage area of the second eNB and cause interference to UEs served by the second eNB. The inter-cell interference (ICI) for small cell wireless communications systems is commonly referred to as an interference limited cell scenario, which may be different from a noise limited cell scenario seen in large cell wireless communications systems.

In an example embodiment, an eNodeB may control one or more cells. Multiple remote radio units may be connected to the same baseband unit of the eNodeB by fiber cable, and the latency between the baseband unit and the remote radio unit is quite small. Therefore the same baseband unit can process the coordinated transmission/reception of multiple cells. For example, the eNodeB may coordinate the transmissions of multiple cells to a UE, which is called coordinated multiple point (CoMP) transmission. The eNodeB may also coordinate the reception of multiple cells from a UE, which is called CoMP reception. In this case, the backhaul link between these cells with the same eNodeB is fast backhaul and the scheduling of PDSCH transmitted in different cells for the UE can be easily coordinated in the same eNodeB.

In an example embodiment, a device and method signaling a set of downlink analog beamforming reference signal (BFRS) to a UE is provided. A BFRS resource may include time, frequency and sequence. A BFRS transmission may consist of the sequential transmission of analog transmit beams supported in the eNodeB. The cell signals the BFRS resource, its total number of analog beams, and the analog beam grouping information to the UE. The UE should not derive the digital CSI feedback involving more than two analog beams from the same group.

In another example embodiment, a device and method for signaling a set of analog beam restriction configuration to UE are provided. The restriction may indicate a set of analog beams upon which the UE should not derive the digital CSI feedback including any of the analog beams indicated in the restriction configuration. The UE should not derive the digital CSI feedback involving more than two analog beams from the same group.

In an example embodiment, the signaling may be in the forms of macro cell broadcasting, macro sending UE-specific radio resource control (RRC) signaling, small cell broadcasting, small cells sending UE-specific radio resource control (RRC) signaling, or any combination of the above.

In an example embodiment, a UE receives the configuration of BFRS transmission of a set of network controllers and a set of analog beam restriction configuration. The UE receives each transmit analog beam after applying each of the UE's receive beams. The UE collects the channel response for each of the transmit-receive-beam pairs. The UE performs sorting and pruning on the transmit-receive-beam pairs according to some metric, e.g. reference signal received power (RSRP) or signal-to-interference-plus-noise ratio (SINR).

In an example embodiment, a UE selects the best transmit-receive-beam pairs to form the effective MIMO channels and virtual antenna ports. Multiple effective MIMO channels can be formed by including one transmit beam from one or more transmit beam groups, or one or more receive beams. For example, a system with four sets of transmit beams (one set of transmit beams includes the RF chain, phase shift, and antenna array) at the eNodeB side, and two sets of receive beams (one set of receive beam includes RF chain, phase shift, and antenna array) at the UE side, could form 4×2, 3×2, 2×2, 1×2, 4×1, 3×1, 2×1 and 1×1 various effective MIMO channels.

The selection to form effective MIMO channels can follow the received analog beam restriction configuration. The effective MIMO channel should not include any transmit analog beams indicated in the restriction configuration. The effective MIMO channel should not include more than one transmit analog beam belonging to the same group.

In an example embodiment, the UE derives the CSI feedback based on the effective MIMO channels and selects the best set(s) to feedback to the network. The feedback set should include the indexes of the analog transmit beams forming the selected effective MIMO channel and its corresponding rank, CQI, PMI or the pre-coding matrix. More than one set of feedback may be reported to the network, covering different rank or different effective MIMO choices of the same rank, according to network feedback configurations.

In an example embodiment, the UE only reports the best analog transmit beams to the network. The reported transmit beams may not be from the same group. The reported transmit beams may not include any transmit beams indicated in the received beam restriction configuration. The UE may send uplink sounding signals by applying the receive beams from the selected transmit-receive-beam pair as the transmit beams. The eNodeB receives these analog beams and derives the CSI information for later downlink data transmission.

In an example embodiment, analog beams are divided into transmit groups. Each transmit group may correspond to one transmit RF chain. Each transmit group may contain many transmit beams, and when beam scanning is performed, each beam may be transmitted sequentially. The UE receives the beam scanning signal by sequentially trying each of the UE's receive beams.

Figure 8:
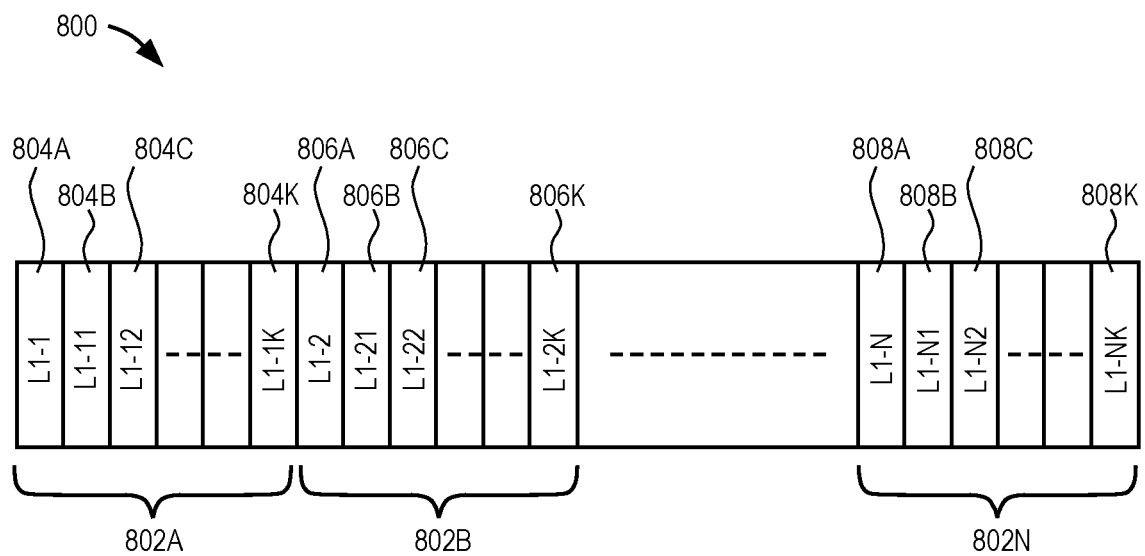
FIG. 8 is a diagram illustrating an example frame structure in accordance with an example embodiment.

FIG. 8 is a diagram illustrating an example frame structure 800 in accordance with an example embodiment. Here, the frame structure 800 includes N wide beams (labeled 802A, 802B, 802N). Each wide beam 802A, 802B, 802N includes K narrow beams within it (labeled 804A-K, 806A-K, and 808A-K.

Though the above descriptions are mainly for LTE systems, the concepts may be applicable in other systems such as HSPA systems, WiFi systems, etc.

Figure 9:
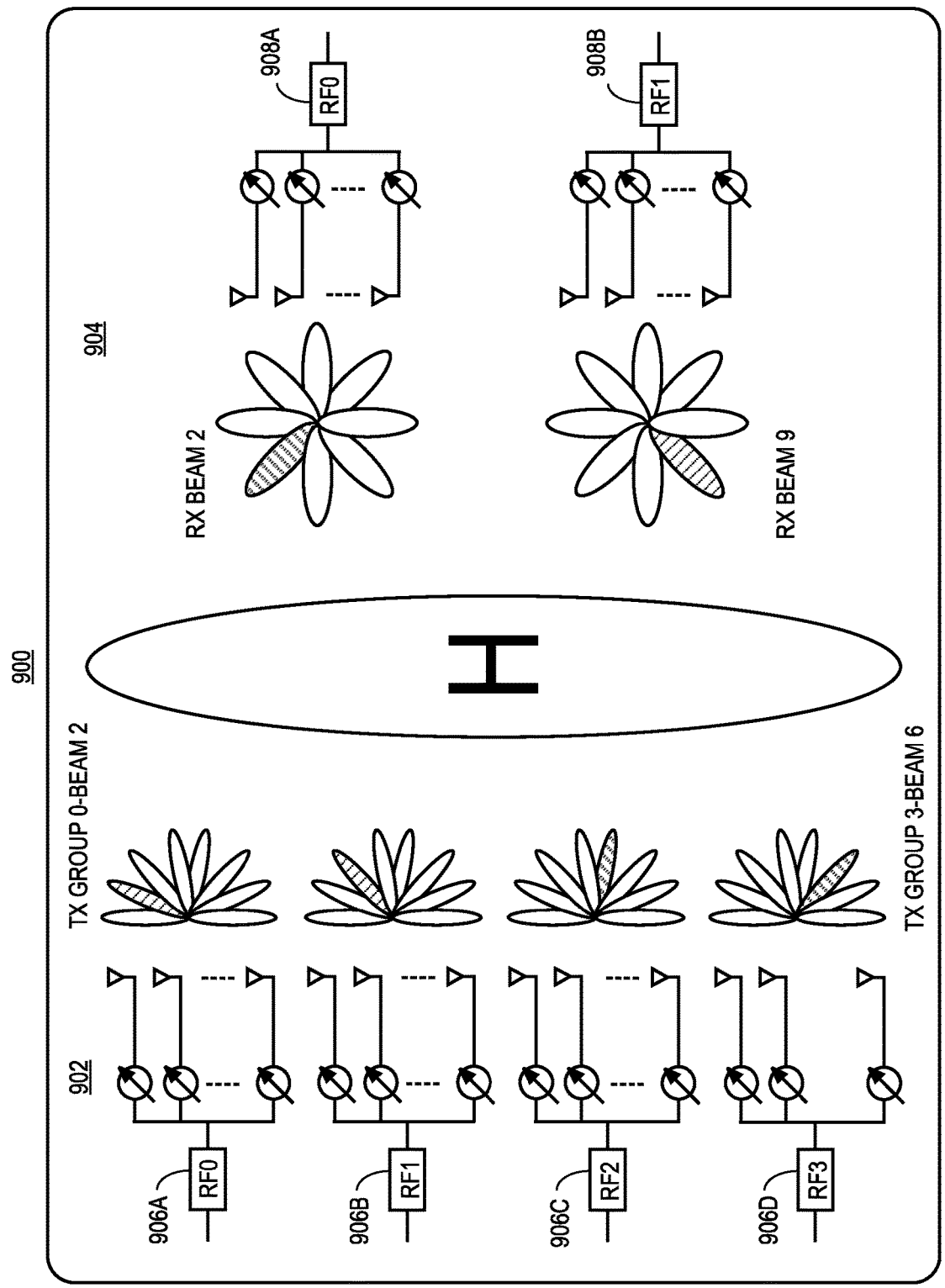
FIG. 9 is a diagram illustrating a system for sequentially transmitting a beam scanning signal in accordance with an example embodiment.

FIG. 9 is a diagram illustrating a system 900 for sequentially transmitting a beam scanning signal in accordance with an example embodiment. On the transmit side 902, multiple RF transmitters 906A-906D act to transmit the narrow beams sequentially to the receive side 904, where RF receivers 908A-908B sequentially try each of its receive beams.

The following figures are diagrams of a processing system that may be used for implementing the devices and methods disclosed herein. Specific devices may utilize all of the components shown, or only a subset of the components, and levels of integration may vary from device to device.

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an application specific integrated circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIGS. 1-9 are implemented, in some embodiments, in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things" while yet another combination produces a server computer for use within a cloud computing architecture. Not all combinations of such software and hardware architectures are presented here as those of skill in the art can readily understand how to implement the inventive subject matter in different contexts from the disclosure contained herein.

Software Architecture

Figure 10:
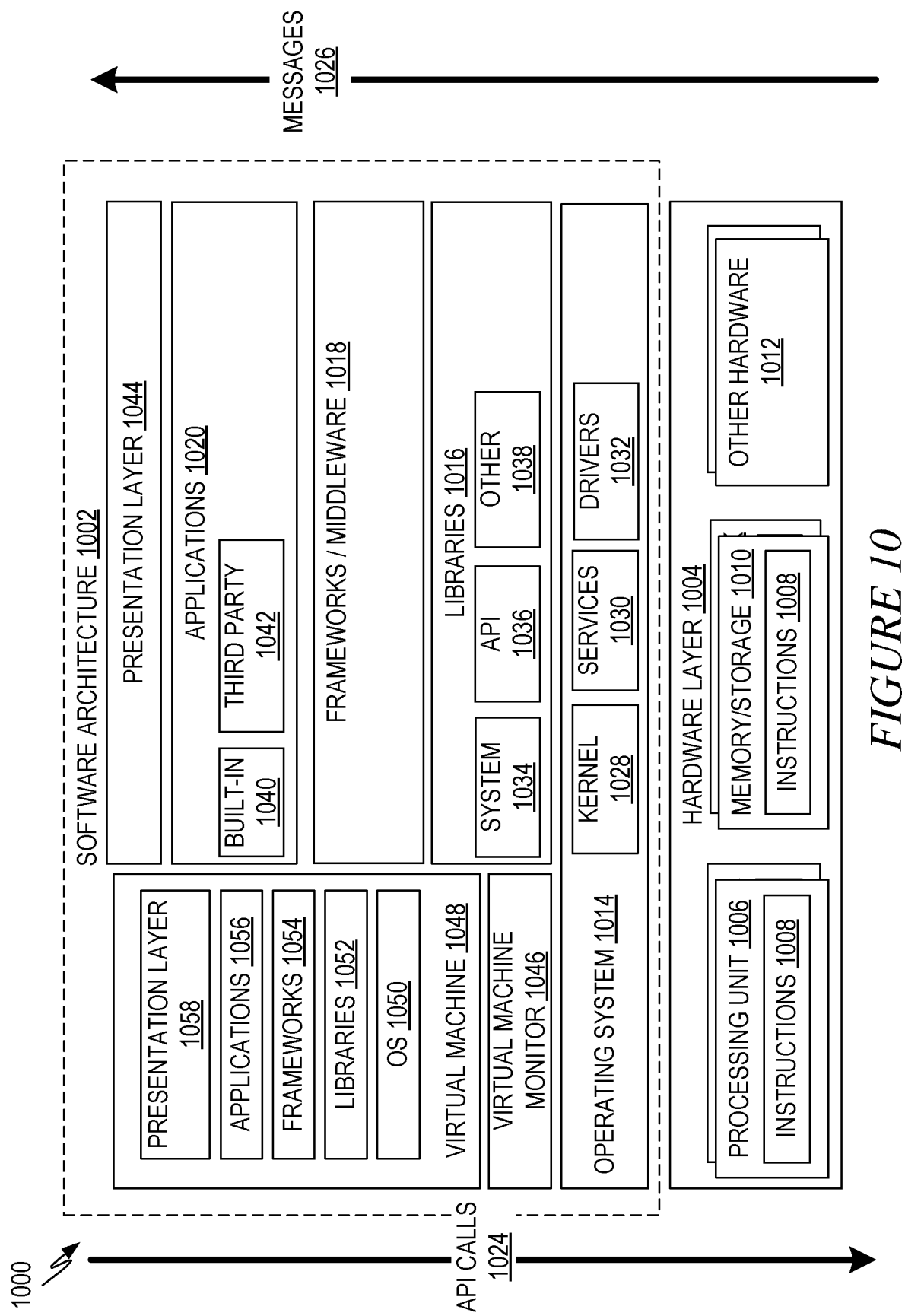
FIG. 10 is a block diagram illustrating a representative software architecture, which may be used in conjunction with various hardware architectures herein described.

FIG. 10 is a block diagram 1000 illustrating a representative software architecture 1002, which may be used in conjunction with various hardware architectures herein described. FIG. 10 is merely a non-limiting example of a software architecture 1002 and it will be appreciated that many other architectures may be implemented to facilitate the functionality described herein. The software architecture 1002 may be executing on hardware such as machine 1100 of FIG. 11 that includes, among other things, processors 1110, memory/storage 1130, and I/O components 1150. A representative hardware layer 1004 is illustrated and can represent, for example, the machine 1100 of FIG. 11. The representative hardware layer 1004 comprises one or more processing units 1006 having associated executable instructions 1008. Executable instructions 1008 represent the executable instructions of the software architecture 1002, including implementation of the methods, modules and so forth of FIGS. 1-9. Hardware layer 1004 also includes memory and/or storage modules 1010, which also have executable instructions 1008. Hardware layer 1004 may also comprise other hardware 1012, which represents any other hardware of the hardware layer 1004, such as the other hardware illustrated as part of machine 1100.

In the example architecture of FIG. 10, the software architecture 1002 may be conceptualized as a stack of layers where each layer provides particular functionality. For example, the software architecture 1002 may include layers such as an operating system 1014, libraries 1016, frameworks/middleware 1018, applications 1020 and presentation layer 1044. Operationally, the applications 1020 and/or other components within the layers may invoke application programming interface (API) calls 1024 through the software stack and receive a response, returned values, and so forth illustrated as messages 1026 in response to the API calls 1024. The layers illustrated are representative in nature and not all software architectures 1002 have all layers. For example, some mobile or special purpose operating systems may not provide a frameworks/middleware 1018, while others may provide such a layer. Other software architectures may include additional or different layers.

The operating system 1014 may manage hardware resources and provide common services. The operating system 1014 may include, for example, a kernel 1028, services 1030, and drivers 1032. The kernel 1028 may act as an abstraction layer between the hardware and the other software layers. For example, the kernel 1028 may be responsible for memory management, processor management (e.g., scheduling), component management, networking, security settings, and so on. The services 1030 may provide other common services for the other software layers. The drivers 1032 may be responsible for controlling or interfacing with the underlying hardware. For instance, the drivers 1032 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 1016 may provide a common infrastructure that may be utilized by the applications 1020 and/or other components and/or layers. The libraries 1016 typically provide functionality that allows other software modules to perform tasks in an easier fashion than to interface directly with the underlying operating system 1014 functionality (e.g., kernel 1028, services 1030 and/or drivers 1032). The libraries 1016 may include system libraries 1034 (e.g., C standard library) that may provide functions such as memory allocation functions, string manipulation functions, mathematic functions, and the like. In addition, the libraries 1016 may include API libraries 1036 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1016 may also include a wide variety of other libraries 1038 to provide many other APIs to the applications 1020 and other software components/modules.

The frameworks/middleware 1018 (also sometimes referred to as middleware) may provide a higher-level common infrastructure that may be utilized by the applications 1020 and/or other software components/modules. For example, the frameworks/middleware 1018 may provide various graphic user interface (GUI) functions, high-level resource management, high-level location services, and so forth. The frameworks/middleware 1018 may provide a broad spectrum of other APIs that may be utilized by the applications 1020 and/or other software components/modules, some of which may be specific to a particular operating system 1014 or platform.

The applications 1020 include built-in applications 1040 and/or third-party applications 1042. Examples of representative built-in applications 1040 may include, but are not limited to, a contacts application, a browser application, a book reader application, a location application, a media application, a messaging application, and/or a game application. Third-party applications 1042 may include any of the built-in applications 1040 as well as a broad assortment of other applications. In a specific example, the third-party application 1042 (e.g., an application developed using the Android™ or iOS™ software development kit (SDK) by an entity other than the vendor of the particular platform) may be mobile software running on a mobile operating system such as iOS™, Android™ Windows® Phone, or other mobile operating systems. In this example, the third-party application 1042 may invoke the API calls 1024 provided by the mobile operating system such as operating system 1014 to facilitate functionality described herein.

The applications 1020 may utilize built-in operating system functions (e.g., kernel 1028, services 1030 and/or drivers 1032), libraries (e.g., system libraries 1034, API libraries 1036, and other libraries 1038), and frameworks/middleware 1018 to create user interfaces to interact with users of the system. Alternatively, or additionally, in some systems, interactions with a user may occur through a presentation layer, such as presentation layer 1044. In these systems, the application/module "logic" can be separated from the aspects of the application/module that interact with a user.

Some software architectures utilize virtual machines. In the example of FIG. 10, this is illustrated by virtual machine 1048. A virtual machine creates a software environment where applications/modules can execute as if they were executing on a hardware machine (such as the machine 1100 of FIG. 11, for example). A virtual machine 1048 is hosted by a host operating system (operating system 1014 in FIG. 10) and typically, although not always, has a virtual machine monitor 1046, which manages the operation of the virtual machine 1048 as well as the interface with the host operating system (i.e., operating system 1014). A software architecture 1002 executes within the virtual machine 1048 such as an operating system 1050, libraries 1052, frameworks/middleware 1054, applications 1056 and/or presentation layer 1058. These layers of software architecture executing within the virtual machine 1048 can be the same as corresponding layers previously described or may be different.

Example Machine Architecture and Machine-Readable Medium

Figure 11:
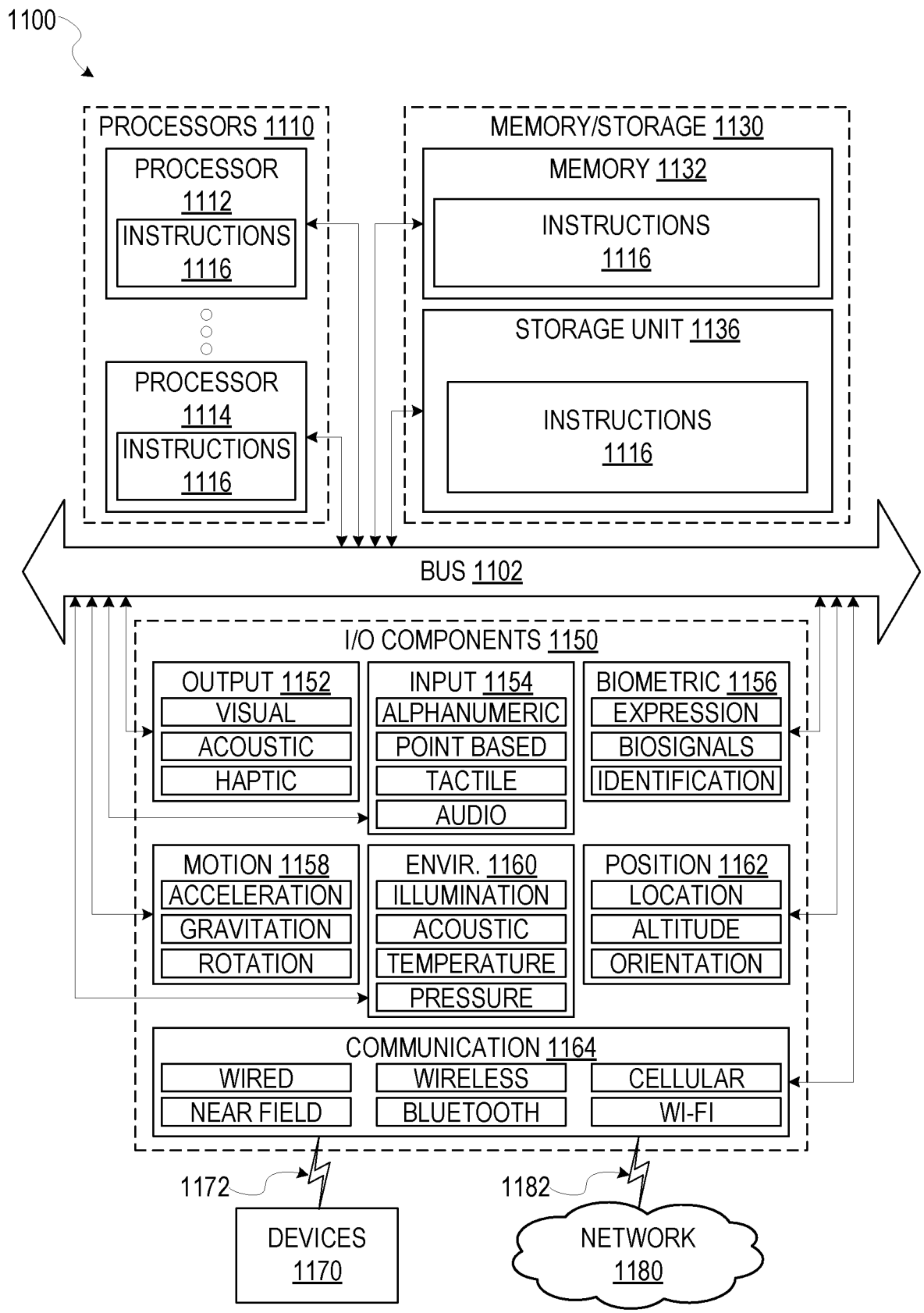
FIG. 11 is a block diagram illustrating components of a machine, according to some example embodiments, able to read instructions from a machine-readable medium (e.g., a machine-readable storage medium) and perform any one or more of the methodologies discussed herein.

FIG. 11 is a block diagram illustrating components of a machine 1100, according to some example embodiments, able to read instructions 1116 from a machine-readable medium (e.g., a machine-readable storage medium) and perform any one or more of the methodologies discussed herein. Specifically, FIG. 11 shows a diagrammatic representation of the machine 1100 in the example form of a computer system, within which instructions 1116 (e.g., software, a program, an application, an applet, an app, or other executable code) for causing the machine 1100 to perform any one or more of the methodologies discussed herein may be executed. For example, the instructions 1116 may cause the machine 1100 to execute the flow diagrams of FIGS. 4 and 5. Additionally, or alternatively, the instructions 1116 may implement modules of FIGS. 1-9, and so forth. The instructions 1116 transform the general, non-programmed machine 1100 into a particular machine programmed to carry out the described and illustrated functions in the manner described. In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1116, sequentially or otherwise, that specify actions to be taken by machine 1100. Further, while only a single machine 1100 is illustrated, the term "machine" shall also be taken to include a collection of machines 1100 that individually or jointly execute the instructions 1116 to perform any one or more of the methodologies discussed herein.

The machine 1100 may include processors 1110, memory/storage 1130, and I/O components 1150, which may be configured to communicate with each other such as via a bus 1102. In an example embodiment, the processors 1110 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, processor 1112 and processor 1114 that may execute instructions 1116. The term "processor" is intended to include multi-core processor 1112, 1114 that may comprise two or more independent processors 1112, 1114 (sometimes referred to as "cores") that may execute instructions 1116 contemporaneously. Although FIG. 11 shows multiple processors 1110, the machine 1100 may include a single processor 1112, 1114 with a single core, a single processor 1112, 1114 with multiple cores (e.g., a multi-core processor 1112, 1114), multiple processors 1112, 1114 with a single core, multiple processors 1112, 1114 with multiples cores, or any combination thereof.

The memory/storage 1130 may include a memory 1132, such as a main memory, or other memory storage, and a storage unit 1136, both accessible to the processors 1110 such as via the bus 1102. The storage unit 1136 and memory 1132 store the instructions 1116 embodying any one or more of the methodologies or functions described herein. The instructions 1116 may also reside, completely or partially, within at least one of the processors 1110 (e.g., within the processor 1112, 1114's cache memory), or any suitable combination thereof, during execution thereof by the machine 1100. Accordingly, the memory 1132, the storage unit 1136, and the memory of processors 1110 are examples of machine-readable media.

As used herein, "machine-readable medium" means a device able to store instructions 1116 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)) and/or any suitable combination thereof. The term "machine-readable medium" should be taken to include a single medium or multiple media (e.g., a centralized or distributed database, or associated caches and servers) able to store instructions 1116. The term "machine-readable medium" shall also be taken to include any medium, or combination of multiple media, that is capable of storing instructions (e.g., instructions 1116) for execution by a machine (e.g., machine 1100), such that the instructions 1116, when executed by one or more processors of the machine 1100 (e.g., processors 1110), cause the machine 1100 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1150 may include a wide variety of components to receive input, provide output, produce output, transmit information, exchange information, capture measurements, and so on. The specific I/O components 1150 that are included in a particular machine 1100 will depend on the type of machine 1100. For example, portable machines such as mobile phones will likely include a touch input device or other such input mechanisms, while a headless server machine will likely not include such a touch input device. It will be appreciated that the I/O components 1150 may include many other components that are not shown in FIG. 11. The I/O components 1150 are grouped according to functionality merely for simplifying the following discussion and the grouping is in no way limiting. In various example embodiments, the I/O components 1150 may include output components 1152 and input components 1154. The output components 1152 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1154 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1150 may include biometric components 1156, motion components 1158, environmental components 1160, or position components 1162 among a wide array of other components. For example, the biometric components 1156 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1158 may include acceleration sensor components (e.g., accelerometer), gravitation sensor components, rotation sensor components (e.g., gyroscope), and so forth. The environmental components 1160 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1162 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1150 may include communication components 1164 operable to couple the machine 1100 to a network 1180 or devices 1170 via coupling 1182 and coupling 1172 respectively. For example, the communication components 1164 may include a network interface component or other suitable device to interface with the network 1180. In further examples, communication components 1164 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1170 may be another machine or any of a wide variety of peripheral devices (e.g., a peripheral device coupled via a Universal Serial Bus (USB)).

Moreover, the communication components 1164 may detect identifiers or include components operable to detect identifiers. For example, the communication components 1164 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1164, such as location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 1180 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1180 or a portion of the network 1180 may include a wireless or cellular network and the coupling 1182 may be a Code Division Multiple Access (CDMA) connection, a Global System for Mobile communications (GSM) connection, or other type of cellular or wireless coupling. In this example, the coupling 1182 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1116 may be transmitted or received over the network 1180 using a transmission medium via a network interface device (e.g., a network interface component included in the communication components 1164) and utilizing any one of a number of well-known transfer protocols (e.g., hypertext transfer protocol (HTTP)). Similarly, the instructions 1116 may be transmitted or received using a transmission medium via the coupling 1192 (e.g., a peer-to-peer coupling) to devices 1170. The term "transmission medium" shall be taken to include any intangible medium that is capable of storing, encoding, or carrying instructions 1116 for execution by the machine 1100, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method for wireless communications, the method comprising:
   signaling, by a first network controller to a user equipment (UE) and using at least a first physical downlink control channel (PDCCH) signaling, a first set of downlink resources for communicating a first set of reference signals;
   signaling, by the first network controller to the UE and using at least a second PDCCH signaling, a second set of downlink resources for communicating a second set of reference signals, wherein the first and second PDCCH signaling occupy non-overlapping frequency resources;
   signaling, by the first network controller to the UE, restriction configurations for the UE to select reference signals from the first set of reference signals and the second set of reference signals, and generate channel feedback information based on the selected reference signals, wherein the restriction configurations indicate which reference signal of the first or second set of reference signals the UE is to exclude when generating the channel feedback information;
   mapping different sets of radio transmission resources to different reference signals from one or both of the first and second sets of reference signals;
   transmitting, to the UE, the first set of reference signals and the second set of reference signals using the radio transmission resources; and
   receiving, from the UE, in a single reporting instance, multiple reports of channel feedback information based on the selected reference signals.

2. The method of claim 1, wherein transmitting a reference signal of the first or second set of reference signals comprises transmitting on a transmission beam.

3. The method of claim 2, wherein the transmission beam is generated through analog beamforming, digital precoding, or a combination of both.

4. The method of claim 1, wherein the transmitting includes sending both the first set of reference signals and the second set of reference signals to the UE by the first network controller or sending the first set of reference signals to the UE by the first network controller and sending the second set of reference signals to the UE by a second network controller.

5. The method of claim 1, wherein the set of radio transmission resources include time and frequency at which the reference signal of the first or second set of reference signals is transmitted, and a sequence to generate the reference signal.

6. A method for utilizing a reference signal, the method comprising:
   receiving, by a user equipment (UE), a configuration of reference signal transmissions and a restriction configuration associated with reference signal selection, wherein the configuration is received via physical downlink control channel (PDCCH) signaling on non-overlapping frequency resources;
   receiving, by the UE, the reference signal transmissions using radio transmission resources, the radio transmission resources mapped to different reference signals;
   selecting, by the UE, a portion of the reference signals, wherein the selection of reference signals is based on the restriction configuration, and wherein the restriction configuration indicates which of the reference signals the UE is to exclude when generating channel feedback information;
   measuring, by the UE, channel quality on each of a plurality of antenna ports;
   deriving, by the UE, based on the measured channel quality on each of the plurality of antenna ports, multiple reports of Channel State Information (CSI); and
   transmitting, by the UE, in a single reporting instance, the multiple reports of the CSI, the reports of the CSI including information about at least one of rank, Channel Quality Indicator (CQI) or Precoding Matrix Indicator (PMI) of the plurality of antenna ports formed based on downlink resources of the selected reference signals.

7. The method of claim 6, wherein the receiving, by the UE, of the reference signal transmissions is performed by applying one or more different receive beams.

8. The method of claim 7, wherein each of the one or more receive beams is generated through one or both of analog beamforming or digital precoding.

9. The method of claim 7, wherein the one or more receive beams, selected to form the plurality of antenna ports and reported to network, are for receiving subsequent data transmissions.

10. The method of claim 9, further comprising transmitting a reference signal index and its CSI feedback.

11. The method of claim 6, wherein the CSI includes a pre-coding matrix in lieu of the PMI.

12. An apparatus of a user equipment (UE), the apparatus comprising:
- a receiver configured to receive a configuration of reference signal transmissions, a restriction configuration associated with reference signal selection and a plurality of reference signals, wherein the configuration of reference signal transmissions is received via physical downlink control channel (PDCCH) signaling on non-overlapping frequency resources, the plurality of reference signals received via radio transmission resources mapped to different reference signals;
- a non-transitory memory storage comprising instructions;
- one or more processors in communication with the receiver and to the memory, wherein the one or more processors execute the instructions to:
  - select a portion of the plurality of reference signals in forming a plurality of antenna ports, wherein the selection of the reference signals is based on the restriction configuration and the plurality of antenna ports are formed based on downlink resources of the selected reference signals, wherein the restriction configuration identifies one or more of the plurality of reference signals to be deselected when forming the plurality of antenna ports;
  - measure channel quality of each of the plurality of antenna ports; and
  - derive multiple reports of Channel State Information (CSI) based on the channel quality of each of the plurality of the antenna ports; and
- a transmitter configured to transmit in a single reporting instance, the multiple reports of the CSI, the multiple reports of the CSI including information about at least one of rank, Channel Quality Indicator (CQI) or Pre-coding Matrix Indicator (PMI) of the plurality of antenna ports.

13. The apparatus of claim 12, wherein the transmitter is further configured to:
transmit indexes of the selected reference signals and an uplink sounding signal.

14. The apparatus of claim 13, wherein the uplink sounding signal is transmitted in receive beams, which form the plurality of antenna ports in the multiple reports.

15. The apparatus of claim 13, wherein the indexes of the selected reference signals and the uplink sounding signal are transmitted in analog receive beams.

16. The apparatus of claim 12, wherein the restriction configuration and the plurality of reference signals are received in a beamforming shared array.

17. The apparatus of claim 12, wherein the restriction configuration and the plurality of reference signals are received in a beamforming sub-array.

18. A method for wireless communications, the method comprising:
- receiving, by a user equipment (UE), a configuration of reference signal transmissions, a total number of analog transmit beams for a beamforming reference signal (BFRS) and a restriction configuration, wherein the restriction configuration includes a set of analog beam selection restriction configurations, and wherein the analog beam selection restriction configurations indicate a set of analog beams upon which the UE should not derive a digital Channel State Information (CSI) feedback;
- receiving, by the UE, reference signal transmissions via radio transmission resources mapped to different reference signals;
- performing, by the UE, selection of reference signals to form sets of antenna ports;
- measuring, by the UE, channel quality on the sets of antenna ports;
- deriving, by the UE, based on the sets of antenna ports, a corresponding CSI of hybrid beamforming; and
- reporting, by the UE, a set of reports corresponding to each set of antenna ports, the reports including a rank, a Channel Quality Indicator (CQI), and a Precoding Matrix Indicator (PMI) of a pre-coding matrix, or the pre-coding matrix and corresponding reference signals upon which the reports are derived, to a base station.

19. The method of claim 18, wherein the receiving, by the UE, of the reference signal transmissions is performed by applying a different receive beam among UE's receive beams.

20. The method of claim 19, wherein the different receive beam is generated through analog beamforming, digital precoding, or a combination of both.

21. The method of claim 18, wherein the receive beams, selected to form antenna ports and reported to network, are used for receiving subsequent data transmissions.

22. The method of claim 21, wherein reporting to the network includes a reference signal index and its CSI feedback.

23. The method of claim 18, wherein selection of a reference signal to form antenna ports follows the restriction configuration.

* * * * *

UNITED STATES PATENT AND TRADEMARK OFFICE
CERTIFICATE OF CORRECTION

PATENT NO. : 10,554,280 B2
APPLICATION NO. : 15/139674
DATED : February 4, 2020
INVENTOR(S) : Cheng et al.

Page 1 of 1

It is certified that error appears in the above-identified patent and that said Letters Patent is hereby corrected as shown below:

On page 2, in Column 2, under "Other Publications", Line 1, delete "Serical" and insert --Serial-- therefor Signed and Sealed this
Sixteenth Day of June, 2020

Andrei Iancu
*Director of the United States Patent and Trademark Office*